United States Patent Office 3,574,749
Patented Apr. 13, 1971

3,574,749
1-(4-AMIDOPHENOXY)-3-AMINO-2-
PROPANOL DERIVATIVES
Ralph Howe and Leslie Harold Smith, Macclesfield, England, assignors to Imperial Chemical Industries Limited, London, England
No Drawing. Filed Oct. 23, 1967, Ser. No. 677,027
Claims priority, application Great Britain, Nov. 3, 1966, 49,369/66
Int. Cl. C07c 103/30
U.S. Cl. 260—562                                  4 Claims

ABSTRACT OF THE DISCLOSURE

The disclosure relates to 1-acylamino-3-amino-2-propanol derivatives, processes for their manufacture and pharmaceutical compositions containing them. The said compounds possess $\beta$-adrenergic blocking activity and are useful in the treatment of heart diseases. Representative of the compounds disclosed is 1-(2-allyloxy-4-propionamidophenoxy)-3-isopropylamino-2-propanol.

---

This invention relates to new alkanolamine derivatives which possess $\beta$-adrenergic blocking activity and which are therefore useful in the treatment or prophylaxis of heart diseases, for example angina pectoris and cardiac arrhythmias, and in the treatment of hypertension and phaeochromocytoma, in man.

According to the invention we provide alkanolamine derivatives of the formula:

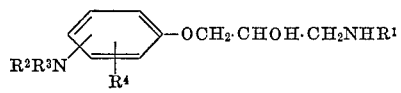

wherein $R^1$ stands for an alkyl radical which may optionally be substituted by one or more hydroxy radicals, or for a cycloalkyl or alkenyl radical, or for an aralkyl radical which may optionally be substituted by one or more radicals selected from halogen atoms and alkoxy radicals; wherein either $R^2$ stands for hydrogen or for an alkyl radical, $R^3$ stands for an acyl radical and $R^4$ stands for an acylamino, alkenyl, nitro, hydroxy, alkoxy, alkenyloxy, alkynyloxy or aralkoxy radical, or $R^2$ and $R^3$ are joined, together with the adjacent nitrogen atom, to form a cyclic imido radical and $R^4$ stands for hydrogen, or for an acylamino, alkenyl, nitro, hydroxy, alkoxy, alkenyloxy, alkynyloxy or aralkoxy radical; and the esters thereof; and the aldehyde condensation products thereof; and the acid-addition salts thereof.

It is to be understood that the above definition of alkanolamine derivatives encompasses all possible stereo-isomers thereof, and mixtures thereof.

As a suitable value for $R^1$ when it stands for an alkyl or hydroxyalkyl radical there may be mentioned, for example, an alkyl radical of not more than 12 carbon atoms which may optionally be substituted by one or two hydroxy radicals, for example the ethyl, n-propyl, isopropyl, s-butyl, t-butyl, 1-methyloctyl or 2-hydroxy-1,1-dimethylethyl radical.

As a suitable value for $R^1$ when it stands for a cycloalkyl radical there may be mentioned, for example, a cycloalkyl radical of not more than 8 carbon atoms, for example the cyclopropyl, cyclobutyl or cyclopentyl radical.

As a suitable value for $R^1$ or $R^4$ when it stands for an alkenyl radical there may be mentioned, for example, an alkenyl radical of not more than 6 carbon atoms, for example the allyl radical.

As a suitable value for $R^1$ when it stands for an aralkyl radical there may be mentioned, for example, an alkyl radical of not more than 6 carbon atoms which is substituted by a phenyl radical or by a phenyl radical itself substituted by one or more substituents selected from halogen atoms, for example chlorine and bromine atoms, and alkoxy radicals, for example alkoxy radicals of not more than 5 carbon atoms, for example methoxy radicals. Thus, a specific value for $R^1$ when it stands for a substituted or unsubstituted aralkyl radical is, for example, the 1-methyl-3-phenylpropyl, 2-(4-methoxyphenyl)-1-methylethyl or 3-(4-chlorophenyl)-1,1-dimethylpropyl radical.

As a suitable value for $R^2$ when it stands for an alkyl radical there may be mentioned, for example, an alkyl radical of not more than 4 carbon atoms, for example the methyl or ethyl radical.

As a suitable value for $R^3$ when it stands for an acyl radical there may be mentioned, for example, an acyl radical derived from a carboxylic acid or from a sulphonic acid. Such a radical may be, for example, the formyl radical; an alkanoyl, hydroxyalkanoyl or haloalkanoyl radical, for example an alkanoyl, hydroxyalkanoyl or haloalkanoyl radical of not more than 6 carbon atoms, for example the acetyl, propionyl, hexanoyl, hydroxyacetyl, chloroacetyl or trifluoroacetyl radical; an alkenoyl radical, for example an alkenoyl radical of not more than 6 carbon atoms, for example the acryloyl or crotonoyl radical; an aroyl radical, for example an aroyl radical of not more than 10 carbon atoms, for example the benzoyl, p-toluoyl, p-chlorobenzoyl or p-acetamidobenzoyl radical; an aralkanoyl radical, for example an aralkanoyl radical of not more than 10 carbon atoms, for example the phenylacetyl radical; an aryloxyalkanoyl radical, for example an aryloxyalkanoyl radical of not more than 10 carbon atoms, for example the phenoxyacetyl radical; a cycloalkanecarbonyl radical, for example a cycloalkanecarbonyl radical of not more than 10 carbon atoms, for example the cyclopropanecarbonyl or cyclohexanecarbonyl radical; an alkanesulphonyl radical, for example an alkanesulphonyl radical of not more than 6 carbon atoms, for example the methanesulphonyl radical, an arenesulphonyl radical, for example an arenesulphonyl radical of not more than 10 carbon atoms, for example the benzenesulphonyl or toluene-p-sulphonyl radical; or an alkoxycarbonyl radical, for example an alkoxycarbonyl radical of not more than 6 carbon atoms, for example the ethoxycarbonyl radical.

As a suitable value for the cyclic imido radical formed by $R^2$, $R^3$ and the adjacent nitrogen atom there may be mentioned, for example, an alkyleneimido, alkenyleneimido or aryleneimido radical, for example such a radical of not more than 10 carbon atoms, for example the succinimido, maleimido or phthalimido radical.

As a suitable value for $R^4$ when it stands for an acylamino radical there may be mentioned, for example, a radical of the formula —$NR^2R^3$, wherein $R^2$ and $R^3$ have the meanings stated above. Thus, a specific value for $R^4$ when it stands for an acylamino radical is, for example, the acetamido radical.

As a suitable value for $R^4$ when it stands for an alkoxy radical there may be mentioned, for example, an alkoxy radical of not more than 5 carbon atoms, for example the methoxy, ethoxy or isopropoxy radical.

As a suitable value for $R^4$ when it stands for an alkenyloxy radical there may be mentioned, for example, an alkenyloxy radical of not more than 5 carbon atoms, for example the allyloxy radical.

As a suitable value for $R^4$ when it stands for an alkynyloxy radical there may be mentioned, for example, an alkynyloxy radical of not more than 5 carbon atoms, for example the propargyloxy radical.

As a suitable value for $R^4$ when it stands for an aralkoxy radical there may be mentioned, for example, an aralkoxy radical of not more than 10 carbon atoms, for example the benzyloxy radical.

As suitable esters of the alkanolamine derivatives there may be mentioned, for example, O-esters derived from an aliphatic carboxylic acid, for example such an acid of not more than 20 carbon atoms, for example acetic, hexanoic, palmitic, stearic or oleic acid, or an aromatic carboxylic acid, for example such an acid of not more than 10 carbon atoms, for example benzoic acid, and the acid-addition salts thereof.

It is to be understood that by the expression aldehyde condensation products we mean oxazolidinederivatives of the formula:

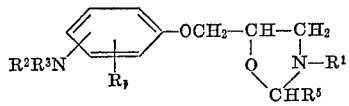

wherein $R^1$, $R^2$, $R^3$ and $R^4$ have the meanings stated above and wherein $R^5$ stands for hydrogen or for an alkyl radical, and the acid-addition salts thereof.

As a suitable value for $R^5$ when it stands for an alkyl radical there may be mentioned, for example, an alkyl radical of not more than 4 carbon atoms, for example the isopropyl radical.

As suitable acid-addition salts of the alkanolamine derivatives of the invention, or the esters or the oxazolidines derived therefrom, there may be mentioned, for example, salts derived from inorganic acids, for example hydrochlorides, hydrobromides, phosphates or sulphates, or salts derived from organic acids, for example oxalates, lactates, tartrates, acetates, salicylates, citrates, benzoates, β-naphthoates, adipates or 1,1-methylene-bis-(2-hydroxy-3-naphthoates), or salts derived from acidic synthetic resins, for example sulphonated polystyrene resins, for example "Zeo-Karb" 225 ("Zeo-Karb" is a trademark).

A preferred group of new alkanolamine derivatives of the invention comprises compounds of the formula:

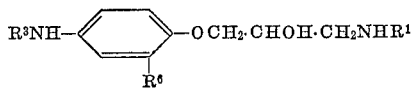

wherein $R^1$ has the meaning stated above, wherein $R^3$ stands for an acyl radical and wherein $R^6$ stands for an alkenyl, nitro, hydroxy, alkoxy, alkenyloxy, alkynyloxy or aralkoxy radical, and the acid-addition salts thereof. Specific values for $R^1$ and $R^3$ are those defined above, and specific values for $R^6$ are those values defined above for $R^4$ which fall within the scope of $R^6$.

Of the above preferred compounds, particularly preferred compounds have the formula given above wherein $R^1$ stands for the isopropyl or t-butyl radical, wherein $R^3$ stands for the acetyl or propionyl radical, and wherein $R^6$ stands for the allyl, nitro, hydroxy, methoxy, ethoxy, allyloxy or benzyloxy radical.

Specific alkanolamine derivatives of the present invention which fall within the scope of the preferred group of compounds are, for example, 1-(4-acetamido-2-nitrophenoxy)-3-isopropylamino-2-propanol;
1-(4-acetamido-2-allyloxyphenoxy)-3-isopropylamino-2-propanol;
1-(2-allyloxy-4-propionamidophenoxy)-3-t-butylamino-2-propanol;
1-(2-allyloxy-4-propionamidophenoxy)-3-isopropylamino-2-propanol;
1-(4-acetamido-2-methoxyphenoxy)-3-isopropylamino-2-propanol;
1-(4-acetamido-2-benzyloxyphenoxy)-3-isopropylamino-2-propanol;
1-(2-benzyloxy-4-propionamidophenoxy)-3-isopropylamino-2-propanol;
1-(2-benzyloxy-4-propionamidophenoxy)-3-t-butylamino-2-propanol;
1-(4-acetamido-2-hydroxyphenoxy)-3-isopropylamino-2-propanol;
1-(2-hydroxy-4-propionamidophenoxy)-3-isopropylamino-2-propanol;
1-(4-acetamido-2-allylphenoxy)-3-isopropylamino-2-propanol;
1-(2-allyl-4-propionamidophenoxy)-3-isopropylamino-2-propanol;
1-(2-allyl-4-propionamidophenoxy)-3-t-butylamino-2-propanol;
1-(2-ethoxy-4-propionamidophenoxy)-3-isopropylamino-2-propanol;
1-(2-ethoxy-4-propionamidophenoxy)-3-t-butylamino-2-propanol;
1-(2-nitro-4-propionamidophenoxy)-3-isopropylamino-2-propanol;
1-(2-nitro-4-propionamidophenoxy)-3-t-butylamino-2-propanol;
1-(2-methoxy-4-propionamidophenoxy)-3-isopropylamino-2-propanol; and
1-(2-methoxy-4-propionamidophenoxy)-3-t-butylaminopropanol and the acid-addition salts thereof.

Other specific alkanolamine derivatives of the present invention are, for example, 1-(3,4-diacetamidophenoxy)-3-isopropylamino-2-propanol and 1-(4-phthalimidophenoxy)-3-isopropylamino-2-propanol and the acid addition salts thereof. Specific aldehyde condensation products of the invention are 5-(2-benzyloxy-4-propionamidophenoxymethyl)-3-isopropyloxazolidine and the acid-addition salts thereof.

According to a further feature of the invention we provide a process for the manufacture of the alkanolamine derivatives of the invention, and the acid-addition salts thereof, which comprises the interaction of a compound of the formula:

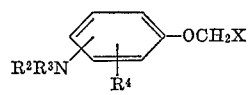

wherein $R^2$, $R^3$ and $R^4$ have the meanings stated above, and wherein X stands for the group

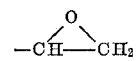

or the group $-CHOH \cdot CH_2Y$, wherein Y stands for a halogen atom, or of mixtures of such compounds wherein X has both meanings stated above, with an amine of the formula $NH_2R^1$, wherein $R^1$ has the meaning stated above, whereafter, if desired, the product in free base form is reacted with an acid in order to form an acid-addition salt.

As a suitable value for Y there may be mentioned, for example, a chlorine or bromine atom. The interaction may be carried out at ambient temperature or it may be accelerated or completed by the application of heat, for example by heating to a temperature of 90–110° C.; it may be carried out at atmospheric or at an elevated pressure, for example by heating in a sealed vessel; and it may be carried out in an inert diluent or solvent, for example methanol or ethanol, or an excess of the amine of the formula $NH_2R^1$, wherein $R^1$ has the meaning stated above, may be used as diluent or solvent.

The starting material used in the above process may be obtained by the interaction of the corresponding phenol with an epihalohydrin, for example epichlorohydrin. The said starting material may be isolated or it may be prepared and used in situ without isolation.

According to a further feature of the invention we provide a process for the manufacture of those of the alkanolamine derivatives of the invention wherein $R^1$ does not stand for a hydrogenolysable group, and the acid-addition salts thereof, which comprises the hydrogenolysis of a compound of the formula:

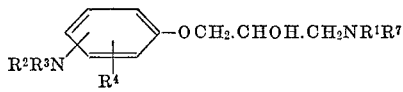

wherein $R^1$, $R^2$, $R^3$ and $R^4$ have the meanings stated above and wherein $R^7$ stands for a hydrogenolysable radical, or an acid-addition salt thereof, whereafter, if desired, the product in free base form is reacted with an acid in order to form an acid-addition salt.

As a suitable value for $R^7$ there may be mentioned, for example, the benzyl radical. The hydrogenolysis may be effected, for example, by catalytic hydrogenation, for example by hydrogenation in the presence of a palladium-on-charcoal catalyst, in an inert diluent or solvent, for example ethanol or aqueous ethanol, and it may be effected at ambient temperature and at atmospheric pressure. The process may be accelerated or completed by the presence of an acidic catalyst, for example oxalic acid.

Those of the starting materials used in the last-mentioned process wherein $R^3$ stands for an acyl radical may be obtained by the acylation of the corresponding compound wherein $R^3$ stands for hydrogen with an acylating agent derived from the acid of the formula $R^3$—OH, wherein $R^3$ has the meaning stated above.

According to a further feature of the invention we provide a process for the manufacture of those of the alkanolamine derivatives of the invention wherein $R^4$ stands for the hydroxy radical and wherein $R^1$ does not stand for a hydrogenolysable radical, and the acid-addition salts thereof, which comprises the hydrogenolysis of the corresponding compound wherein $R^4$ stands for an α-aryl-alkoxy radical, for example the benzyloxy radical, or an acid-addition salt thereof; whereafter, if desired, the product in free base form is reacted with an acid in order to form an acid-addition salt.

The hydrogenolysis may be carried out, for example, by catalytic hydrogenation, for example using a palladium-on-charcoal catalyst, in an inert diluent or solvent, for example ethanol.

According to a further feature of the invention we provide a process for the manufacture of the esters of the alkanolamine derivatives of the invention which comprises the interaction of an acid-addition salt of the corresponding unesterified alkanolamine derivative with an acylating agent.

As a suitable acylating agent there may be mentioned, for example, an acid halide or acid anhydride derived from an aliphatic carboxylic acid of not more than 20 carbon atoms, for example acetic, hexanoic, palmitic, stearic or oleic acid, or from an aromatic carboxylic acid of not more than 10 carbon atoms, for example benzoic acid. Thus a suitable acylating agent is, for example, acetic anhydride or hexanoyl chloride. The acylation may be carried out in a diluent or solvent, which, in the case where an acid anhydride is used as acylating agent, may conveniently be the acid from which the anhydride is derived.

According to a further feature of the invention we provide a process for the manufacture of the oxazolidine derivatives of the alkanolamines of the invention which comprises the interaction of the corresponding alkanolamine derivative, or an acid-addition salt thereof, with an aldehyde of the formula $R^5$.CHO, wherein $R^5$ has the meaning stated above.

The said interaction may be carried out in a diluent or solvent, for example ethanol, optionally in the presence of a catalyst, for example hydrochloric acid, acetic acid or iodine, and it may be accelerated or completed by the application of heat. The water formed during the reaction may optionally be removed by azeotropic distillation using a suitable solvent, for example benzene, toluene or chloroform, as entraining agent, or it may optionally be removed by means of a dehydrating agent, for example anhydrous potassium carbonate.

As stated above, the alkanolamine derivatives of the present invention are of value in the treatment of prophylaxis of heart diseases. Furthermore, some of the alkanolamine derivatives of the invention possess selective β-adrenergic blocking activity. Compounds exhibiting this selective action show a greater degree of specificity in blocking the cardiac β-receptors than the β-receptors in pheripheral blood vessels and bronchial muscle. Thus, a dose may be selected for such a compound at which the compound blocks the cardiac inotropic and chronotropic actions of a catecholamine [for example isoprenaline, that is, 1-(3,4-dihydroxyphenyl)-2-isopropylamino-ethanol] but does not block the relaxation of tracheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other obstructive airways diseases, inasmuch as the selective compound will substantially inhibit the unwanted stimulatory effects of the bronchodilator on the heart but will not hinder the desirable therapeutic effect of the bronchodilator.

According to a further feature of the invention, therefore, we provide pharmaceutical compositions comprising as active ingredient one or more alkanolamine derivatives of the invention, or esters thereof, or aldehyde condensation products thereof, or acid-addition salts thereof, in association with a pharmaceutically-acceptable diluent or carrier therefor.

As suitable compositions there may be mentioned, for example, tablets, capsules, aqueous or oily solutions or suspensions, emulsions, injectable aqueous or oily solutions or suspensions, dispersible powders and aerosol formulations.

The pharmaceutical compositions of the invention may contain, in addition to the alkanolamine derivative of the invention, one or more additional drugs selected from sedatives, for example phenobarbitone, meprobamate and chlorpromazine; vasodilators, for example glyceryltrinitrate, pentaerythritol tetranitrate and isosorbide dinitrate; diuretics, for example chlorothiazide; hypotensive agents, for example reserpine, bethanidine and guanethidine; myocardial depressants, for example quinidine; and agents used in the treatment of Parkinsonism, for example benzhexol. Those of the pharmaceutical compositions of the invention which contain an alkanolamine derivative which possesses selective β-adrenergic blocking properties as stated above may additionally contain a sympathomimetic bronchodilator, for example isoprenaline, orciprenaline, adrenaline or ephedrine.

It is expected that the preferred compounds would be given to man at an oral dose of between 20 mg. and 400 mg. daily, at doses spaced at 4–6 hourly intervals, or at an intravenous dose of between 1 mg. and 20 mg. daily. Preferred oral dosage forms are tablets or capsules containing 10 mg. or 40 mg. of active ingredient. Preferred intravenous dosage forms are sterile aqueous solutions of nontoxic acid-addition salts of the alkanolamine derivatives, containing between 0.05% and 1% w/v of active ingredient, and more particularly containing 0.1% w/v of active ingredient.

The invention is illustrated but not limited by the following examples in which the parts are by weight:

EXAMPLE 1

A solution of 0.2 part of acetyl chloride in 25 parts of ether is added to a stirred solution of 0.9 part of 1-(4-acetamido - 3 - aminophenoxy) - 3 - (N-benzyl-N-iso-propylamino)-2-propanol in 50 parts of ether which is maintained at 15° C. The mixture is stirred for 2 hours and is then filtered. The solid residue is dissolved in 50 parts of ethanol, 0.3 part of a 5% palladium-on-charcoal catalyst is added, and the mixture is shaken with hydrogen at atmospheric pressure and ambient temperature until the uptake of hydrogen ceases. The mixture is filtered and the filtrate is evaporated to dryness under reduced pressure. The residue is dissolved in 2 parts of methanol and the solution is applied to a 40 cm. x 20 cm. x 2 mm. chromatography plate of Kieselgel HF 254. The plate is developed by means of a solvent mixture of 99 parts of methanol and 1 part of aqueous ammonium hydroxide solution (specific gravity 0.88). The band having an $R_F$ value of 0.28 is collected, dried and extracted twice with 50 parts of methanol each time. The mixture is filtered and the filtrate is evaporated to dryness under reduced pressure. The residue is crystallised from ethyl methyl ketone and there is thus obtained 1 - (3,4 - diacetamidophenoxy)-3-isopropylamino-2-propanol, M.P. 130° C. after softening at 120° C.

The 1 - ( 4 - acetamido - 3 - aminophenoxy) - 3 - (N-benzyl-N-isopropylamino)-2-propanol used as starting material may be obtained as follows:

15.6 parts of epichlorohydrin are added to a solution of 5 parts of 4-acetamido-3-nitrophenol and 1.12 parts of sodium hydroxide in 50 parts of water which is maintained at 15° C. The mixture is stirred for 16 hours of ambient temperature and is then filtered. The solid residue is washed with water, dried and crystallised from isopropanol. There is thus obtained 1 - (4-acetamido-3-nitrophenoxy)-2,3-epoxypropane, M.P. 117–118° C.

A mixture of 1.5 parts of the above compound and 0.9 part of N-benzyl-N-isopropylamine is heated at 100° C. for 3 hours. A solution of 2 parts of the 1-(4-acetamido-3 - nitrophenoxy)-3-N-benzyl-N-isopropylamino-2-propanol thus obtained in 50 parts of ethanol is added dropwise to a rapidly stirred mixture of 6 parts of iron powder, 25 parts of ethanol and 0.1 part of concentrated hydrochloric acid which is heated under reflux. The mixture is stirred and heated under reflux for 1 hour, 0.1 part of concentrated hydrochloric acid is then added, and the mixture is stirred and heated under reflux for a further 2 hours. 4 parts of aqueous 10N-sodium hydroxide solution are then added and the hot mixture is filtered. The filtrate is evaporated to dryness under reduced pressure and the residue is dissolved in 50 parts of aqueous N-hydrochloric acid and treated with carbon. The mixture is filtered and the filtrate is poured into 25 parts of aqueous 5N-sodium hydroxide solution. The mixture is extracted with 50 parts of ethylacetate and the ethyl acetate solution is dried over anhydrous magnesium sulphate, filtered, and the filtrate is evaporated to dryness under reduced pressure. There is thus obtained 1 - (4-acetamido-3-aminophenoxy)-3-(N-benzyl-N-isopropylamino)-2-propanol.

EXAMPLE 2

A mixture of 5 parts of 1-(4-acetamido-2-nitrophenoxy)-2,3 - epoxypropane and 20 parts of isopropylamine is heated under reflux for 3 hours. The mixture is evaporated to dryness under reduced pressure and the residue is dissolved in 50 parts of aqueous N-hydrochloric acid. The mixture is filtered and the filtrate is added to 25 parts of aqueous 5N-sodium hydroxide solution. The mixture is extracted with 50 parts of ethyl acetate and the extract is dried over anhydrous magnesium sulphate, filtered and the filtrate is evaporated to dryness under reduced pressure. The residue is dissolved in 2 parts of methanol and the solution is applied to a 40 cm. x 20 cm. x 2 mm. chromatography plate of Kieselgel HF 254. The plate is developed by means of a solvent mixture of 99 parts of methanol and 1 part of aqueous ammonium hydroxide solution (specific gravity 0.88). The band having an $R_F$ value of 0.27 is collected, dried and extracted twice with 50 parts of methanol each time. The mixture is filtered and the filtrate is evaporated to dryness under reduced pressure. The residue is crystallised from ethyl methyl ketone and there is thus obtained 1 - (4-acetamido-2-nitrophenoxy)-3-isopropylamino-2-propanol, M.P. 132–134° C.

The 1-(4-acetamido-2-nitrophenoxy)-2,3-epoxypropane used as starting material may be obtained as follows:

4.7 parts of epichlorohydrin are added to a stirred solution of 3.64 parts of 4-acetamido-2-nitrophenol, 0.8 part of sodium hydroxide and 60 parts of water which is maintained at 15° C. The solution is stirred at ambient temperature for 5 hours and is then extracted twice with 50 parts of chloroform each time. The combined chloroform extracts are dried over anhydrous magnesium sulphate, filtered and the filtrate is evaporated to dryness. The residue consists of 1 - (4-acetamido-2-nitrophenoxy)-2,3-epoxypropane.

EXAMPLE 3

A mixture of 1.55 parts of 1-(4-aminophenoxy)-3-(N-benzyl-N-isopropylamino) - 2-propanol and 0.5 part of phthalic anhydride is heated at 150° C. for 3 hours. The mixture is cooled, stirred with 20 parts of ether and then filtered. The solid residue is stirred with 15 parts of aqueous 2N-hydrochloric acid and the mixture is filtered. The solid residue is dissolved in a mixture of 20 parts of ethanol and 5 parts of water, 0.25 part of a 5% palladium-on-charcoal catalyst is added, and the mixture is shaken with hydrogen at atmospheric pressure and ambient temperature until the uptake of hydrogen ceases. The mixture is filtered and the filtrate is evaporated to dryness under reduced pressure. The residue is crystallised from aqueous isopropanol and there is thus obtained 1-(4-phthalimidophenoxy)-3 - isopropylamino-2-propanol hydrochloride, M.P. 246–248° C.

EXAMPLE 4

A mixture of 1.3 parts of 1-(4-acetamido-2-allyloxyphenoxy)-2,3-epoxypropane and 25 parts of isopropylamine is heated under reflux for 3 hours. The mixture is evaporated to dryness under reduced pressure, the residue is shaken with 25 parts of aqueous N-hydrochloric acid and the mixture is extracted with 25 parts of ethyl acetate. The aqueous phase is separated and basified with aqueous 11N-sodium hydroxide, solution, and the mixture is extracted twice with 25 parts of ethyl acetate each time. The combined ethyl acetate extracts are dried over anhydrous magnesium sulphate and evaporated to dryness under reduced pressure, and the residue is crystallised from a mixture of 5 parts of ethyl acetate and 5 parts of petroleum ether (B.P. 60–80° C.). There is thus obtained 1-(4-acetamido - 2 - allyloxy-phenoxy)-3-isopropylamino-2-propanol, M.P. 124–126° C.

The 1-(4-acetamido-2-allyloxyphenoxy)-2,3-epoxypropane used as starting material may be obtained as follows:

A mixture of 8.3 parts of sulphanilic acid, 2.26 parts of anhydrous sodium carbonate, 3.16 parts of sodium nitrite and 51.5 parts of water is cooled to 15° C. and then added to a mixture of 9 parts of concentrated aqueous hydrochloric acid and 50 parts of ice. The mixture is kept for 15 minutes and is then added to a mixture of 6.3 parts of 2-allyloxyphenol, 9.4 parts of sodium hydroxide, 50 parts of water and 40 parts of ice. The mixture is stirred for 2 hours, the temperature being kept below 5° C., and is then heated to 45° C. 19.6 parts of sodium dithionite are added, the mixture is heated to 95° C. and a further 13 parts of sodium dithionite are added, the mixture is boiled for 15 minutes, cooled and filtered. There is thus obtained as solid product 2-allyloxy-4-aminophenol, M.P. 114° C. A mixture of 1.65 parts of the above product, 25 parts of water and 3 parts of acetic anhydride is heated at 95–100° C. for 2 hours. The mixture is cooled, kept at ambient temperature for 18 hours and then filtered. The solid residue is crystallised from water and there is thus obtained 4-acetamido-2-allyloxyphenol, M.P. 118° C. A mixture of 1 part of the above product, 1.6 parts of epichlorohydrin, 20 parts of ethanol, 0.2 part of sodium hydroxide and 2 parts of water is heated under reflux for 5 hours. The mixture is evaporated to dryness and the residue, which is used without further purification, consists of 1-(4-acetamido-2-allyloxyphenoxy)-2,3-epoxypropane.

EXAMPLE 5

The process described in Example 4 is repeated except that 1 - (2-allyloxy-4-propionamidophenoxy)-2,3-epoxypropane is used as starting material in place of 1-(4-acetamido-2-allyloxyphenoxy)-2,3-epoxypropane. There is thus obtained 1-(2-allyloxy-4-propionamidophenoxy)-3-isopropylamino-2-propanol, M.P. 128–130° C. (crystallised from ethyl acetate).

The process described above is repeated except that t-butylamine is used in place of isopropylamine. There is thus obtained 1-(2-allyloxy-4-propionamidophenoxy)-3-t-butylamino-2-propanol, M.P. 108° C. (crystallised from ethyl acetate).

The 1-(2-allyloxy-4-propionamidophenoxy)-2,3-epoxypropane used as starting material may be obtained by a similar process to that described in the second part of Example 4, except that propionic anhydride is used in place of acetic anhydride, 2-allyloxy-4-propionamidophenol, an intermediate in this process, has M.P. 118° C. after crystallisation from ethyl acetate.

EXAMPLE 6

The process described in Example 2 is repeated except that the 1-(4-acetamido-2-nitrophenoxy)-2,3-epoxypropane is replaced by 1-(4-acetamido-2-methoxyphenoxy)-2,3-epoxypropane. The desired product has an RF value of 0.4 on the chromatography plate, and after isolation from the plate is stirred with ether. The mixture is filtered and there is thus obtained as solid residue 1-(4-acetamido-2-methoxyphenoxy) - 3-isopropylamino-2-propanol, M.P. 128–130° C.

The 1-(4-acetamido-2-methoxyphenoxy)-2,3-epoxypropane used as starting material may be obtained by a similar process to that described in the second part of Example 2, except that the 4-acetamido-2-nitrophenol is replaced by 4-acetamido-2-methoxyphenol.

EXAMPLE 7

A mixture of 1.5 parts of 1-(4-acetamido-2-benzyloxyphenoxy)-2,3-epoxypropane and 25 parts of isopropylamine is heated under reflux for 4 hours. The mixture is evaporated to dryness under reduced pressure, the residue is shaken with 50 parts of aqueous N-hydrochloric acid and the mixture is extracted with 50 parts of ether. The aqueous phase is separated and basified with aqueous 11N-sodium hydroxide solution. The mixture is filtered and the solid residue is washed with water, dried and crystallised from ethyl acetate. There is thus obtained 1-(4-acetamido - 2 - benzyloxyphenoxy)-3-isopropylamino-2-propanol, M.P. 116–118° C.

The 1 - (4-acetamido-2-benzyloxyphenoxy)-2,3-epoxypropane used as starting material may be obtained by a similar process to that described in the second part of Example 4, except that 2-benzyloxyphenol is used in place of 2-allyloxyphenol, 4-amino-2-benzyloxyphenol, an intermediate in this process, has M.P. 116° C. after crystallisation from ethyl acetate, 4-acetamido-2-benzyloxyphenol, a further intermediate in the process, has M.P. 152–154° C. after crystallisation from water and then from a mixture of equal parts of ethyl acetate and petroleum ether (B.P. 80–100° C.).

EXAMPLE 8

The process described in Example 7 is repeated except that 1-(2-benzyloxy-4-propionamidophenoxy)-2,3-epoxypropane is used as starting material in place of 1-(4-acetamido-2-benzyloxyphenoxy)-2,3-epoxypropane. There is thus obtained 1-(2-benzyloxy-4-propionamidophenoxy)-3-isopropylamino-2-propanol, M.P. 136–138° C. (crystallised from ethyl acetate).

The process described above is repeated except that t-butylamine is used in place of isopropylamine. The product is isolated and purified by preparative thin-layer chromatography substantially as described in the first part of Example 2, and there is thus obtained 1-(2-benzyloxy-4-propionamidophenoxy)-3-t-butylamino-2-propanol as an uncrystallisable glass. The structure of the compound is confirmed by proton magnetic resonance spectroscopy.

The 1 - (2 - benzyloxy - 4-propionamidophenoxy)-2,3-epoxypropane used as starting material may be obtained by a similar process to that described in the second part of Example 7, which in turn refers to the second part of Example 4, except that propionic anhydride is used in place of acetic anhydride. 2-benzyloxy-4-propionamidophenol, an intermediate in this process, has M.P. 120° C. after crystallisation from ethyl acetate.

EXAMPLE 9

A mixture of 0.9 part of 1-(4-acetamido-2-benzyloxyphenoxy-3-isopropylamino - 2 - propanol, 50 parts of ethanol and 1 part of a 5% palladium-on-charcoal catalyst is shaken with hydrogen at atmospheric pressure and ambient temperature until the uptake of hydrogen ceases. The mixture is filtered and the filtrate is evaporated to dryness under reduced pressure. The residue is crystallised from a mixture of 5 parts of ethyl acetate and 5 parts of petroleum ether (B.P. 60–80° C.) and there is thus obtained 1 - (4-acetamido-2-hydroxyphenoxy)-3-isopropylamino-2-propanol, M.P. 134–136° C.

The process described above is repeated except that 1-(2 - benzyloxy - 4 - propionamidophenoxy)-3-isopropylamino-2-propanol is used as starting material. There is thus obtained 1-(2-hydroxy-4-propionamidophenoxy)-3-isopropylamino-2-propanol, M.P. 148–149° C. after crystallisation from isopropanol.

EXAMPLE 10

A mixture of 4.2 parts of 1-(4-acetamido-2-allylphenoxy)-3-chloro-2-propanol, 14 parts of isopropylamine and 20 parts of methanol is heated in a sealed tube at 110° C. for 12 hours. The excess of isopropylamine and the methanol are removed by evaporation under reduced pressure and the residue is shaken with a mixture of ethyl acetate and water. The organic layer is separated, dried and evaporated to dryness and the residue is crystallised from a mixture of ethyl acetate and hexane. There is thus obtained 1-(4-acetamido - 2 - allylphenoxy)-3-isopropylamino-2-propanol, M.P. 129–132° C.

The process described above is repeated except that 1-(2-allyl - 4 - propionamidophenoxy)-3-chloro-2-propanol is used as starting material in place of 1-(4-acetamido-2-allylphenoxy)-3-chloro-2-propanol. There is thus obtained 1-(2-allyl-4-propionamidophenoxy) - 3 - isopropylamino-2-propanol, M.P. 124–126° C. (crystallised from a mixture of ethyl acetate and petroleum ether (B.P. 60–80° C.).

The process described in the second paragraph above is repeated except that t-butylamine is used in place of isopropylamine. There is thus obtained 1-(2-allyl-4-propionamidophenoxy) - 3 - t-butylamino-2-propanol, M.P. 148–151° C. (crystallised from a mixture of ethyl acetate and petroleum ether (B.P. 60–80° C.).

The 1 - (2 - allyl - 4-propionamidophenoxy)-3-chloro-2-propanol used as starting material may be obtained as follows:

A mixture of 1.38 parts of 4-propionamidophenol, 1.2 parts of allyl bromide, 1.4 parts of potassium carbonate and 48 parts of acetone is stirred and heated under reflux for 7 hours. The mixture is poured into 250 parts of water and the resulting mixture is extracted with ether. The ethereal extract is dried and evaporated to dryness and the residue is crystallised from a mixture of ethanol and water. There is thus obtained 4-allyloxypropionanilide, M.P. 92–96° C. A mixture of 11 parts of 4-allyloxypropionanilide and 30 parts of diphenyl ether is heated under reflux for 8 minutes. The mixture is cooled and shaken with a mixture of 10% aqueous sodium hydroxide solution and ether. The aqueous layer is separated and acidified with concentrated aqueous hydrochloric acid and the mixture is extracted with ether. The ethereal extract is dried and evaporated to dryness and the residue is crystallised from a mixture of ethyl acetate and petroleum ether (B.P. 60–80° C.). There is thus obtained 2-allyl-4-propionamidophenol, M.P. 119–122° C.

A mixture of 5 parts of 2-allyl-4-propionamidophenol, 50 parts of epichlorohydrin and 0.05 part of piperidine is heated at 95–100° C. for 6 hours. The mixture is evaporated to dryness and the residue, which is used without further purification, consists of 1-(2-allyl-4-propionamidophenoxy)-3-chloro-2-propanol.

1-(4-acetamido-2-allylphenoxy)-3-chloro-2-propanol is prepared in a similar manner to that described in the last paragraph above, using the known 4-acetamido-2-allylphenol as starting material in place of 2-allyl-4-propionamidophenol.

EXAMPLE 11

The process described in Example 10 is repeated except that 1-(2-ethoxy-4-propionamidophenoxy) - 3 - chloro-2-propanol is used as starting material in place of 1-(4-acetamido-2-allylphenoxy)-3-chloro-2-propanol. There is thus obtained 1-(2-ethoxy-4-propionamidophenoxy)-3-isopropylamino-2-propanol, M.P. 144–146° C. (crystallised from a mixture of ethyl acetate and hexane).

The process described above is repeated except that t-butylamine is used in place of isopropylamine. There is thus obtained 1-(2 - ethoxy-4-propionamidophenoxy)-3-t-butylamino-2-propanol, M.P. 148–150° C. (crystallised from ethyl acetate).

The 1-(2 - ethoxy - 4-propionamidophenoxy)-3-chloro-2-propanol used as starting material may be obtained by a similar process to that described in the penultimate paragraph of Example 10, except that 2-ethoxy-4-propionamidophenol is used in place of 2-allyl-4-propionamidophenol. 2-ethoxy-4-propionamidophenol itself may be obtained as follows:

A mixture of 6 parts of 4-amino-2-ethoxyphenol, 25 parts of propionic anhydride and 50 parts of water is heated at 70° C. for 1 hour. The mixture is cooled and filtered and the solid residue is crystallised from ethyl acetate. There is thus obtained 2-ethoxy-4-propionamidophenol, M.P. 132–136° C.

EXAMPLE 12

The process described in Example 10 is repeated except that 1-(2-nitro-4-propionamidophenoxy)-3-chloro-2-propanol is used as starting material in place of 1-(4-acetamido-2-allylphenoxy)-3-chloro - 2 - propanol. There is thus obtained 1-(2-nitro-4-propionamidophenoxy) - 3-isopropylamino-2-propanol, M.P. 134–135.5° C. (crystallised from a mixture of ethyl acetate and hexane).

The process described above is repeated except that t-butylamine is used in place of isopropylamine. There is thus obtained 1-(2-nitro - 4 - propionamidophenoxy)-3-t-butylamino-2-propanol, M.P. 112–114° C. (crystallised from a mixture of ethyl acetate and hexane).

The 1-(2-nitro - 4 - propionamidophenoxy)-3-chloro-2-propanol used as starting material may be obtained by a similar process to that described in the penultimate paragraph of Example 10, except that 2-nitro-4-propionamidophenol is used in place of 2-allyl-4-propionamidophenol. 2-nitro-4-propionamidophenol itself may be obtained as follows:

16.4 parts of 4-propionamidophenol are added slowly to 24.5 parts of concentrated sulphuric acid which are stirred at −5° C. A mixture of 6.6 parts of nitric acid (specific gravity 1.51) and 13.6 parts of concentrated sulphuric acid are added dropwise during one hour to the stirred mixture, the temperature being maintained between 3 and 5° C. The mixture is kept for a further one hour at −5° C. and is then poured onto 800 parts of ice. The mixture is stirred until all the ice has melted and is then filtered. The solid residue is crystallised from water and there is thus obtained 2-nitro-4-propionamidophenol, M.P. 108–110° C.

EXAMPLE 13

The process described in Example 10 is repeated except that 1-(2-methoxy - 4 - propionamidophenoxy)-3-chloro-2-propanol is used as starting material in place of 1-(4-acetamido-2-allylphenoxy)-3-chloro-2-propanol. There is thus obtained 1-(2-methoxy - 4 - propionamidophenoxy)-3-isopropylamino-2-propanol, M.P. 129–130° C. (crystallised from ethyl acetate).

The process described above is repeated except that t-butylamine is used in place of isopropylamine. There is thus obtained 1-(2-methoxy - 4 - propionamidophenoxy)-3-t-butylamino-2-propanol, M.P. 149–150° C. (crystallised from ethyl acetate).

The 1-(2-methoxy - 4 - propionamidophenoxy) - 3-chloro-2-propanol used as starting material may be obtained by a similar process to that described in the penultimate paragraph of Example 10, except that 2-methoxy-4-propionamidophenol is used in place of 2-allyl-4-propionamidophenol. The 2-methoxy-4-propionamidophenol itself may be obtained as follows:

A mixture of 4 parts of 2-methoxy-4-nitrophenol, 10 parts of propionic anhydride, 240 parts of ethanol and 0.5 part of a 5% palladium-on-charcoal catalyst is shaken in an atmosphere of hydrogen at ambient temperature and atmospheric pressure until uptake of hydrogen ceases. The mixture is filtered and the ethanol is removed by evaporation under reduced pressure. 50 parts of water and 5 parts of propionic anhydride are added to the residue and the mixture is stirred and heated at 95–100° C. for 1.5 hours. 350 parts of water are added and the mixture is neutralised with sodium bicarbonate and extracted with ether. The ethereal extracts are dried and evaporated to dryness and there is thus obtained as residue 2-methoxy-4-propionamidophenol, which is used without further purification.

EXAMPLE 14

A mixture of 0.5 part of 1-(2-benzyloxy-4-propionamidophenoxy) - 3 - isopropylamino-2-propanol, 2 parts of a 36% weight/volume aqueous solution of formaldehyde and 25 parts of ethanol is heated under reflux for 6 hours. The mixture is evaporated to dryness under reduced pressure, the residue is dissolved in 10 parts of ethyl acetate and an excess of ethereal hydrogen chloride is added. The mixture is filtered and the solid residue is crystallised from isopropanol. There is thus obtained 5-(2-benzyloxy-4-propionamidophenoxymethyl) - 3 - isopropyloxazolidine hydrochloride, M.P. 180–182° C.

What we claim is:

1. An alkanolamine derivative selected from compounds of the formula:

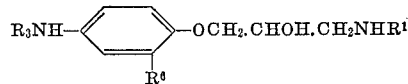

wherein $R^1$ is alkyl or hydroxyalkyl each of from 1 to 9 carbon atoms or cycloalkyl of 3 to 5 carbon atoms, wherein $R^3$ is formyl, alkanoyl, hydroxyalkanoyl and haloalkanoyl each of up to 6 carbon atoms, alkenoyl of from 3 to 4 carbon atoms, benzoyl, phenylacetyl, phenoxyacetyl, cycloalkanecarbonyl of 4 to 7 carbon atoms; and wherein $R^6$ stands for alkenyl of three carbon atoms, nitro, hydroxy, alkoxy of up to 3 carbon atoms, alkenyloxy of three carbon atoms, or benzyloxy and the nontoxic, pharmaceutically-acceptable acid-addition salts thereof.

2. An alkanolamine derivative as claimed in claim 1 which has the formula given in claim 1 wherein $R^1$ stands for isopropyl or t-butyl, wherein $R^3$ stands for acetyl or propionyl and wherein $R^6$ stands for allyl, nitro, hydroxy, methoxy, ethoxy, allyloxy or benzyloxy, and the nontoxic, pharmaceutically-acceptable acid-addition salts thereof.

3. An alkanolamine derivative as claimed in claim 1 which is selected from
1-(4-acetamido-2-nitrophenoxy)-3-isopropylamino-2-propanol;
1-(4-acetamido-2-allyloxyphenoxy)-3-isopropylamino-2-propanol;
1-(2-allyloxy-4-propionamidophenoxy)-3-t-butylamino-2-propanol;
1-(2-allyloxy-4-propionamidophenoxy)-3-isopropylamino-2-propanol;
1-(4-acetamido-2-methoxyphenoxy)-3-isoproylamino-2-propanol;
1-(4-acetamido-2-benzyloxyphenoxy)-3-isopropylamino-2-propanol;
1-(2-benzyloxy-4-propionamidophenoxy)-3-isopropylamino-2-propanol;
1-(2-benzyloxy-4-propionamidophenoxy)-3-t-butylamino-2-propanol;
1-(4-acetamido-2-hydroxyphenoxy)-3-isopropylamino-2-propanol;
1-(2-hydroxy-4-propionamidophenoxy)-3-isopropylamino-2-propanol;
1-(4-acetamido-2-allylphenoxy)-3-isopropylamino-2-propanol;
1-(2-allyl-4-propionamidophenoxy)-3-isopropylamino-2-propanol;
1-(2-allyl-4-propionamidophenoxy)-3-t-butylamino-2-propanol;
1-(2-ethoxy-4-propionamidophenoxy)-3-isopropylamino-2-propanol;
1-(2-ethoxy-4-propionamidophenoxy)-3-t-butylamino-2-propanol;
1-(2-nitro-4-propionamidophenoxy)-3-isopropylamino-2-propanol;
1-(2-nitro-4-propionamidophenoxy)-3-t-butylamino-2-propanol;
1-(2-methoxy-4-propionamidophenoxy)-3-isopropylamino-2-propanol; and
1-(2-methoxy-4-propionamidophenoxy)-3-t-butylamino-2-propanol;

and the nontoxic, pharmaceutically-acceptable acid-addition salts thereof.

4. A nontoxic, pharmaceutically-acceptable acid-addition salt which is selected from the group consisting of the hydrochlorides, hydrobromides, phosphates, sulphates, oxalates, lactates, tartrates, acetates, salicylates, citrates, benzoates, β-naphthoates, adipates and 1,1-methylene-bis-(2-hydroxy-3-naphthoates) of an alkanolamine derivative as claimed in claim 2.

References Cited

UNITED STATES PATENTS 3,408,387   1968   Howe et al. _____ 260—562

FOREIGN PATENTS 6512676   3/1966   Netherlands _____ 260—562

HENRY R. JILES, Primary Examiner

H. I. MOATZ, Assistant Examiner

U.S. Cl. X.R.

260—557, 558, 559, 501.1, 501.17, 307, 348, 326; 424—324